Figure 1:
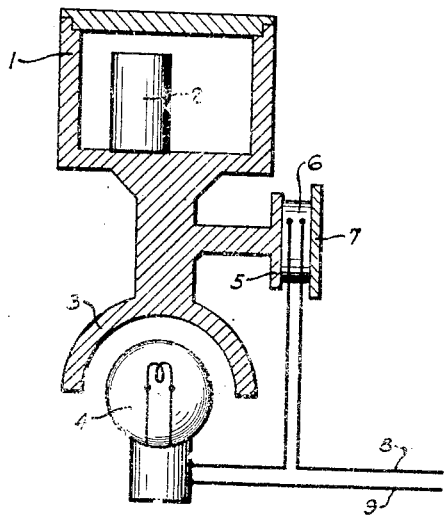

March 2, 1943.                    H. I. HESSE                    2,313,015
                APPARATUS FOR KEEPING A CONSTANT TEMPERATURE
                            Filed Jan. 6, 1941

Holger I. Hesse
INVENTOR

BY Phil L. Rodier

HIS ATTORNEY

Patented Mar. 2, 1943

2,313,015

UNITED STATES PATENT OFFICE 2,313,015

APPARATUS FOR KEEPING CONSTANT TEMPERATURE

Holger I. Hesse, Vedbaek, near Copenhagen, Denmark; vested in the Alien Property Custodian Application January 6, 1941, Serial No. 373,270
In Denmark January 10, 1940

1 Claim. (Cl. 219—19)

This invention relates to an apparatus for keeping a constant temperature, and more particularly for keeping objects, for example specimens for bacteriological purposes, at a constant temperature. The primary object of the invention is to provide such an apparatus, whereby the latter can be made transportable and substantially insensitive to external temperature variations as well as to mechanical shocks.

In the manner used with the other adopted methods, the objects to be kept at a constant temperature are enclosed in a container. In order to control the supply of thermal energy, a feeling element, for instance a bimetallic contact, is provided, which closes or interrupts an electric current, which energizes the heating element. The invention provides a new arrangement for placing these elements in relation to each other.

One part of the adopted thermostatic methods seeks to accomplish the ideal, where the object, the heating element and the feeling element always have the some temperature. Thus external temperature variations will be practically without influence. In order to reach this solution, the container is filled with a fluid as oil or water, and the heating element, the objects and the feeling element are surrounded by the fluid, which may be stirred up by a rotating propeller. The disadvantages of this arrangement are two: Since there shall not be considerable temperature differences within the fluid, and on the other side only very small temperature variations may occur in the regulating process, the feeler has to be sensitive enough to be influenced by these small variations. Furthermore the container has to have some extra volume for the fluid, and consequently the transportation of it is difficult.

In order to compromise with these practical demands, containers without fluid have been used, and somewhat greater temperature differences have been adopted. But in order to prevent their becoming too great, the feeling and controlling elements have to react much more sensitively. The best place for installing the feeler in such an arrangement is, according to the German Patent 672,753, the metallic wall of the container, since the temperature variations there will be the largest of all in the container.

In order to apply less sensitive feeling and controlling devices, and thus to obtain safer working, the feeling member has been placed outside the container and nearer to the source of energy. Since the temperature of the energy source varies much more than the temperature in the container (the ratio may be as high as 1000:1), there will be a place between the energy source and the container, where the temperature during the controlling process varies sufficiently in order to influence a less sensitive controlling device. But by installing the feeling member outside of the container, the temperature in the container will be influenced by the outside temperature. The outside temperature in this case can influence the feeling member only indirectly through the temperature of the container and the heating element. In order to more effectively compensate for the outside temperature changes, the U. S. A. Patent 681,079 proposes to use a second heating member inside the container near the object to be kept at constant temperature.

This invention uses the method of placing the feeling member between the container and the heating element, too, but obtains an automatic compensation for the outside temperature changes without the necessity of a second source of heat energy. This is done by exposing the feeling member not only to the temperature which fluctuates by the temperature changes of the heating element, but also to the outside temperature directly.

In the accompanying drawing

Figure 2:
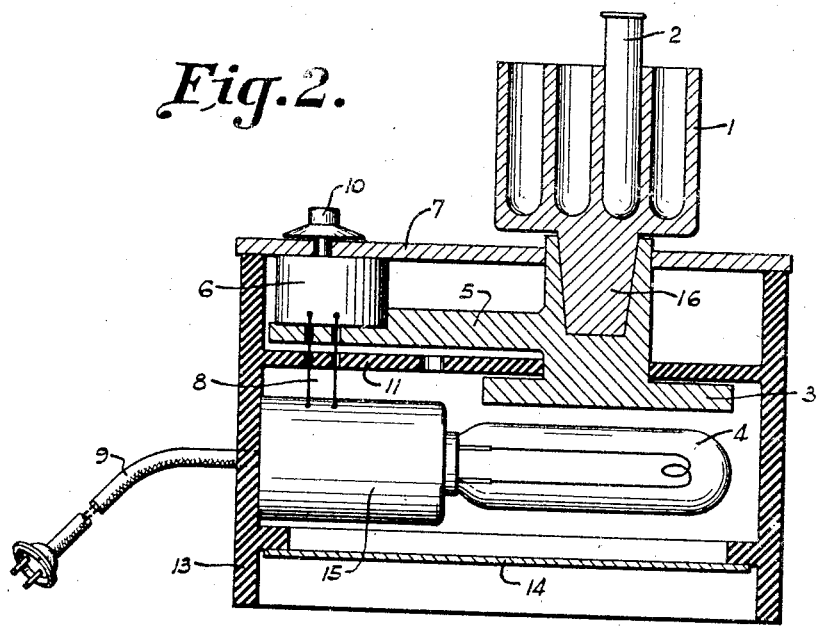

Fig. 1 is a schematic vertical section of one embodiment of an apparatus according to the invention, and Fig. 2 is a similar section of another embodiment.

In Fig. 1 the source of heat, for example an incandescent lamp 4, is controlled by a known heat sensitive contact 6 (bimetallic contact), which in this case combines the functions of the feeling element with that of the controlling member. The member 6 interrupts the current to the heating element, as soon as a predetermined maximum temperature has been reached and it closes the circuit as soon as a predetermined minimum temperature has occurred. The heating element 4 transfers its heat energy to a metallic member 3, which conducts the heat to the walls of a container 1, which are made of metal, too. In the container are enclosed the objects to be kept at constant temperature. One such object 2 is shown in the figure. While the temperature under the thermostatic conditions in the container will vary within the permitted limits of for example ±0.2° centigrade, the temperature in the member 3 will vary much more, for example ±200°. In a member 5, which is in metallic connection with the container as well as the member 3 at an intermediate point and which supports the temperature feeling element 6, the temperature therefore will oscillate at an intermediate rate for example ±5°, thus permitting the use of a feeling member, which is less sensitive than necessary if it had been installed in the container itself.

In the arrangements hitherto known, based upon this conception the feeling member 6 was exposed from all sides to the temperature in member 5, since member 6 was built-in in the metal between 3 and 1. According to this invention the member 6 is only partly exposed to the temperature in 5, and simultaneously it is exposed either directly to the surrounding temperature or to the temperature of a metallic member 7, which mainly is influenced by the surrounding temperature. Thus, when the surrounding temperature is changing and endeavouring to change the temperature in the metal of the container 1, the feeling member 6 "feels" the change simultaneously and thus counteracts by regulating the heat development in the source of heat 4.

This arrangement however can only work in the manner intended, if the thermodynamic rates of the system 3—1 on the one side and 3—5 on the other side are in accordance, i. e., if the rate of increase or decrease of temperature in the both tracks are in correspondence with the temperatures wanted. This can be obtained by choosing proper values of the thermal conduction, masses, etc. of the metal parts.

In the embodiment of the apparatus according to the invention shown in Fig. 2 a container 1, specially formed for keeping test tubes 2, is connected through a cone 16 to the metallic body consisting of two connected members 3 and 5. Member 3 receives periodically heat from the electric lamp 4, which is screwed in a socket 15 and fed from the leads 9 through the thermal contact 6, which is connected into the circuit by wires 8. This contact is placed between the metal member 5 and the metal cover 7 on the housing 13, which is made of heat insulating material for example a phenolic condensation product such as Bakelite.

As soon as the electric current through the lamp 4 is switched in, the temperature in 3, 5, 1 and 2 will rise. At a certain time the contact 6 heated by the member 5 has reached the temperature, at which it interrupts the current to the lamp 4 and the temperature will then drop. As soon as the lower temperature limit for the contact 6 has been reached, the current will be switched on again and so on. After a certain time a thermostatic condition will occur where the oscillations of the temperature in the container 1, in the feeling member (contact) 6 and in the lamp 4 have the same period, but different amplitudes and phases.

All changes in the outside temperature will affect the container 1 and the cover plate 7 at the same time. If the dimensions are properly chosen the change will influence the feeling member 6 to counteract this room temperature change. The cone connection 16 permits to change the pot with another one of another form, but of identical thermal properties. 14 is a plate which prevents heat radiation in a downward direction. A dial 10 permits to adjust the operating temperature of the feeling member and thus to alter the desired temperature of the container 1.

I claim:

A device for maintaining a constant temperature in a holder for test tubes and the like comprising a housing of heat insulating material, an electrical heating element in said housing, a metallic heat conducting member disposed so as to conduct heat from said element to said holder, a second metallic heat conducting member connected to said first-mentioned heat conducting member at a point intermediate said heating element and said holder, a metallic cover plate for said housing, said plate being responsive to variations in atmospheric temperature, and a bimetallic thermostatic temperature responsive control device disposed between and in contact with both said cover plate and said second heat conducting member and connected in circuit with said heating element so as to control the amount of heat emitted from said element in response to the simultaneous temperatures of said second heat conducting member and said cover plate, said holder being of such proportions that its thermal capacity is greater than the thermal capacity of the second heat conducting member so as to minimize cyclic temperature variations affecting said holder.

HOLGER I. HESSE.